US012771137B2

(12) United States Patent
Park et al.

(10) Patent No.: US 12,771,137 B2
(45) Date of Patent: Oct. 20, 2026

(54) ELECTRIFIED VEHICLE AND A POWER CONVERSION SYSTEM OF A BATTERY FOR A VEHICLE

(71) Applicants: HYUNDAI MOTOR COMPANY, Seoul (KR); KIA CORPORATION, Seoul (KR)

(72) Inventors: Sung Uk Park, Busan (KR); Jae Hyun Kim, Incheon (KR); Hyun Wook Seong, Anyang-si (KR); Dong Gyun Woo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 815 days.

(21) Appl. No.: 18/137,525

(22) Filed: Apr. 21, 2023

(65) Prior Publication Data

US 2024/0154422 A1 May 9, 2024

(30) Foreign Application Priority Data

Nov. 3, 2022 (KR) ........................ 10-2022-0145273

(51) Int. Cl.
*H02J 3/32* (2026.01)
*B60L 53/22* (2019.01)
(Continued)

(52) U.S. Cl.
CPC .............. *H02J 3/322* (2020.01); *B60L 53/22* (2019.02); *H02J 7/02* (2013.01); *H02M 1/4216* (2013.01);
(Continued)

(58) Field of Classification Search
CPC .......... H02J 3/322; H02J 7/02; H02J 2207/20; H02J 2105/37; H02J 7/855; B60L 53/22; B60L 2210/10; H02M 1/4216; H02M 7/797; H02M 1/10; H02M 1/425; H02M 3/33584
See application file for complete search history.

(56) References Cited

U.S. PATENT DOCUMENTS 3,600,662 A * 8/1971 Anwander ................ H02J 3/36 363/35
3,626,354 A * 12/1971 Banner ................ H01R 31/065 439/651
(Continued)

FOREIGN PATENT DOCUMENTS

CN 110398639 A * 11/2019 ........... H02H 11/004
CN 215495386 U * 1/2022
KR 20230015763 A 1/2023

*Primary Examiner* — Jared Fureman
(74) *Attorney, Agent, or Firm* — Lempia Summerfield Katz LLC

(57) ABSTRACT

A power conversion system of a battery for a vehicle includes a bidirectional charger configured to output a first active line voltage between a first active line and a neutral line and a second active line voltage between a second active line and the neutral line at different levels by converting a voltage of a battery into an AC voltage in a battery discharge mode, and a wiring swap device configured to electrically connect the first active line to a load-side first active line and to cross and electrically connect the second active line and the neutral line to a load-side neutral line and a load-side second active line, respectively.

16 Claims, 10 Drawing Sheets

(51) Int. Cl.
*H02J 7/02* (2016.01)
*H02M 1/42* (2007.01)
*H02M 7/797* (2006.01)

(52) U.S. Cl.
CPC ......... *H02M 7/797* (2013.01); *B60L 2210/10* (2013.01); *H02J 2207/20* (2020.01)

(56) References Cited

U.S. PATENT DOCUMENTS

| | | | | | |
|---|---|---|---|---|---|
| 3,851,243 | A * | 11/1974 | Banner | G01R 27/20 324/508 |
| 4,204,243 | A * | 5/1980 | Ross | H01R 29/00 324/440 |
| 4,492,878 | A * | 1/1985 | Hamel | H02H 11/002 361/84 |
| 5,086,266 | A * | 2/1992 | Shiga | H02J 7/1438 322/90 |
| 7,551,412 | B2 * | 6/2009 | Winch | H02H 11/002 361/84 |
| 8,466,652 | B2 * | 6/2013 | Klaes | B60L 53/14 320/107 |
| 8,766,474 | B2 * | 7/2014 | Carralero | H02J 3/381 307/65 |
| 10,177,555 | B2 * | 1/2019 | Pan | H02H 3/16 |
| 10,654,371 | B2 * | 5/2020 | Kim | H02J 7/32 |
| 10,688,880 | B2 * | 6/2020 | Kim | H02M 5/4585 |
| 10,971,998 | B2 * | 4/2021 | Kim | H02J 7/02 |
| 11,084,393 | B2 * | 8/2021 | Brauner | B60L 1/006 |
| 11,148,531 | B2 * | 10/2021 | Brauner | B60L 1/006 |
| 11,173,803 | B2 * | 11/2021 | Bhat | B60L 53/22 |
| 11,677,328 | B2 * | 6/2023 | Liu | H02M 7/5387 363/127 |
| 11,955,908 | B2 * | 4/2024 | Sahoo | G01R 19/2513 |
| 12,296,711 | B2 * | 5/2025 | Mahmood | B60L 53/63 |
| 12,413,087 | B2 * | 9/2025 | Kim | H02J 7/933 |
| 2021/0126446 | A1 * | 4/2021 | Gigante | G01R 31/50 |
| 2023/0006569 | A1 * | 1/2023 | Kim | H02M 7/219 |
| 2023/0025134 | A1 * | 1/2023 | Kim | H02J 7/933 |
| 2023/0264577 | A1 * | 8/2023 | Lu | H02M 1/007 307/10.1 |
| 2024/0429831 | A1 * | 12/2024 | Sreedhar | H02M 1/10 |

* cited by examiner

Embodiment

ELECTRIFIED VEHICLE AND A POWER CONVERSION SYSTEM OF A BATTERY FOR A VEHICLE

CROSS REFERENCE TO RELATED APPLICATION

The present application claims the benefit of and priority to Korean Patent Application No. 10-2022-0145273, filed on Nov. 3, 2022, the entire contents of which are incorporated herein by reference.

TECHNICAL FIELD

The present disclosure relates to an electrified vehicle that performs a battery discharge mode, and a power conversion system of a battery for a vehicle.

BACKGROUND

As efforts for reducing carbon dioxide emission globally spread, electrified vehicles that generate driving power by driving a motor using electrical energy stored in an energy storage device such as a battery, instead of typical internal combustion engine vehicles that generate driving power by burning fossil fuel, are greatly increasing.

An electrified vehicle may be equipped with an On Board Charger (OBC) that charges a battery from a system power supplier. In general, an OBC is composed of a Power Factor Correction circuit (PFC) that converts an external alternating current (AC) voltage into a direct current (DC) voltage and a DC/DC converter that adjusts the converted DC voltage into a voltage required by the battery.

Recently, as the capacity of the batteries mounted in electrified vehicles has increased, Vehicle to Grid (V2G), Vehicle to Home (V2H), and Vehicle to Load (V2L) technologies for supplying the energy stored in a battery to a system, a home, and electrical loads through an OBC are being developed.

When discharging a battery, an electrified vehicle may output an AC voltage corresponding to the electricity supply type of a power distribution system by converting the voltage of the battery. Electricity supply types include a single phase two-wire type, a single phase three-wire type, a three phase three-wire type, and a three phase four-wire type. Various electricity supply types are used in various countries.

The contents of this background section are intended to promote an understanding of the background of the present disclosure and may include matters which are not previously known to those having ordinary skill in the art to which the present disclosure pertains.

SUMMARY

An objective of the present disclosure is to provide an AC power corresponding to the electricity supply type of power distribution system when a battery discharge mode is performed in an electrified vehicle.

The technical subjects to implement in the present disclosure are not limited to the technical problems described above and other technical subjects that are not stated herein may be clearly understood by those having ordinary skill in the art from the following specifications.

In an aspect, a power conversion system of a battery for a vehicle includes a bidirectional charger configured to output a first active line voltage between a first active line and a neutral line and a second active line voltage between a second active line and the neutral line at different levels by converting a voltage of a battery into an alternating current (AC) voltage in a battery discharge mode. The power conversion system also includes a wiring swap device configured to electrically connect the first active line to a load-side first active line and to cross and electrically connect the second active line and the neutral line to a load-side neutral line and a load-side second active line, respectively.

In another aspect, an electrified vehicle includes a battery and a DC/DC converter configured to adjust and output a voltage of the battery to first and second DC ends in a battery discharge mode. The electrified vehicle also includes a power factor correction circuit connected between the first and second DC ends, including a plurality of legs of which respective internal nodes are connected to different ones of a first active line, a second active line, and a neutral line, respectively. The power factor correction circuit is configured to output a first active line voltage between a first active line and a neutral line and a second active line voltage between a second active line and the neutral line at different levels by converting a voltage between the first and second DC ends into an AC voltage in a battery discharge mode. The electrified vehicle also includes a wiring swap device configured to electrically connect the first active line to a load-side first active line and cross and electrically connect the second active line and the neutral line to a load-side neutral line and a load-side second active line, respectively, in the battery discharge mode.

According to aspects of the present disclosure, it is possible to provide an AC voltage corresponding to the electricity supply type of a distribution system when a battery discharge mode is performed in an electrified vehicle.

The effects of the present disclosure are not limited to the effects described above and other effects may be clearly understood by those having ordinary skill in the art from the following description.

BRIEF DESCRIPTION OF THE DRAWINGS

The above and other objects, features, and advantages of the present disclosure may be more apparent from the following detailed description taken in conjunction with the accompanying drawings, in which.

DETAILED DESCRIPTION

Figure 1:
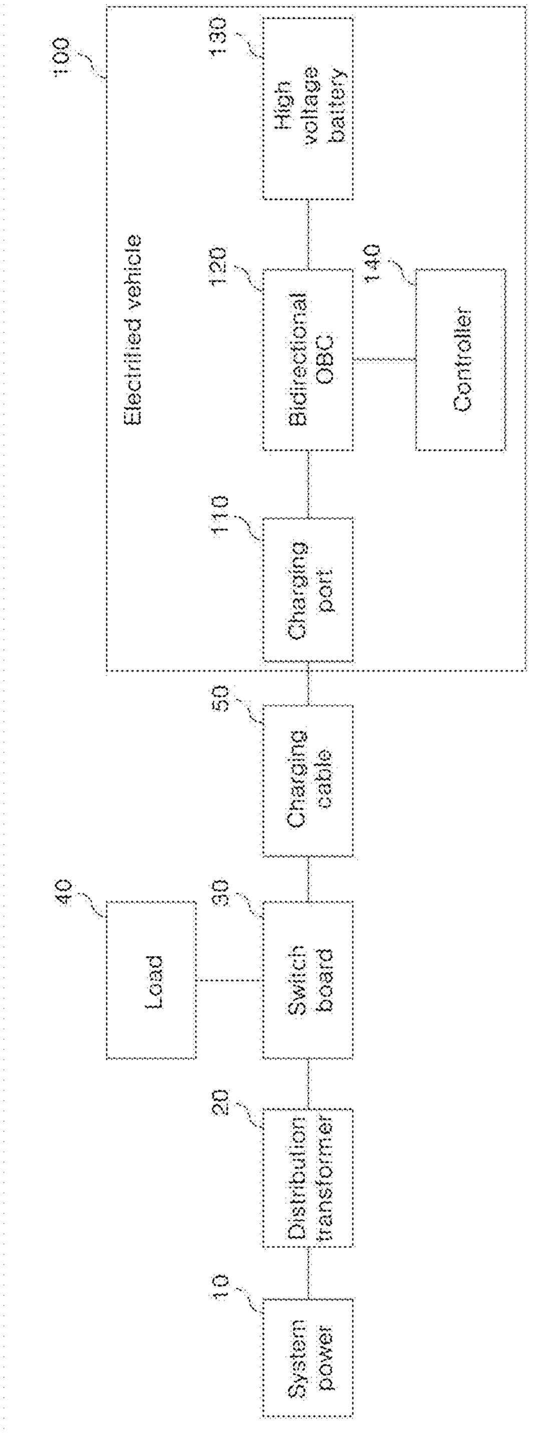
FIG. 1 is a block diagram showing a configuration of a power conversion system of a battery for a vehicle according to an embodiment of the present disclosure.

Hereafter, embodiments of the present disclosure are described in detail with reference to the accompanying drawings. In the accompanying drawings, the same or similar components are given the same reference numerals across the figures, and such components are not repeatedly described herein.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification. The technical spirit disclosed in the specification is not limited by the accompanying drawings, and all changes, equivalents, and replacements should be understood as being included in the spirit and scope of the present disclosure.

In the follow description of embodiments, the term "preset" means that when parameters are used in a process or an algorithm, the values of the parameters have been determined in advance. The values of parameters may be set when a process or an algorithm is started or for the period for which a process or an algorithm is performed.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

The terms "comprise" or "have" used in this specification, specify the presence of stated features, steps, operations, components, parts, or a combination thereof, but do not preclude the presence or addition of one or more other features, numerals, steps, operations, components, parts, or a combination thereof.

A controller may include a communication device that communicates with another controller or a sensor to control corresponding functions, a memory that stores an operating system or logic commands and input/output information, and one or more processors that perform determination, calculation, decision, etc. for controlling the corresponding functions.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram showing a configuration of a power conversion system of a battery for a vehicle according to an embodiment of the present disclosure.

Referring to FIG. 1, a power conversion system of a battery for an electrified vehicle 100 may include a system power supplier 10, a distribution transformer 20, a switch board 30, a load 40, a charging cable 50. The electrified vehicle 100 may include a charging port 110, a bidirectional OBC (hereafter, bidirectional charger) 120, a high-voltage battery 130, and a controller 140.

The distribution transformer 20 may convert and output a voltage, which is applied from the system power supplier 10, to the switch board 30 to which the load 40 and the charging cable 50 are electrically connected.

The switch board 30 may be a distribution panel or a panel board.

The charging cable 50 has a wire for electrically connecting the switch board 30 and the charging port 110 of the electrified vehicle 100 to each other and may have a plug that is coupled to a terminal of the charging port 110.

The bidirectional charger 120 may covert an alternating current (AC) voltage, which is applied through the charging port 110, to a direct current (DC) voltage and may adjust the converted DC voltage into a voltage of the high-voltage battery 130 in a battery charge mode.

The bidirectional charger 120 may adjust the voltage of the high-voltage battery 130, and may convert the adjusted DC voltage to an AC voltage and output the AC voltage to the charging port 110 in a battery discharge mode.

The battery discharge mode may be referred to as Vehicle to Grid (V2G), Vehicle to Home (V2H), or Vehicle to Load (V2L), depending on the object that receives power of the high-voltage battery 130 from the electrified vehicle.

The controller 140 may set the operation mode of the bidirectional charger 120 to the battery charge mode or the battery discharge mode, and may control a turned-on state of a relay or a switch device included in the bidirectional charger 120 in accordance with the set operation modes.

Because the electricity supply type of the power conversion system may depend on the connection wire type of the distribution transformer 20 and the switch board 30, the electrified vehicle 100 may have a configuration for performing the battery charge mode and the battery discharge mode regardless of the electricity supply type of the power conversion system.

Figure 2:
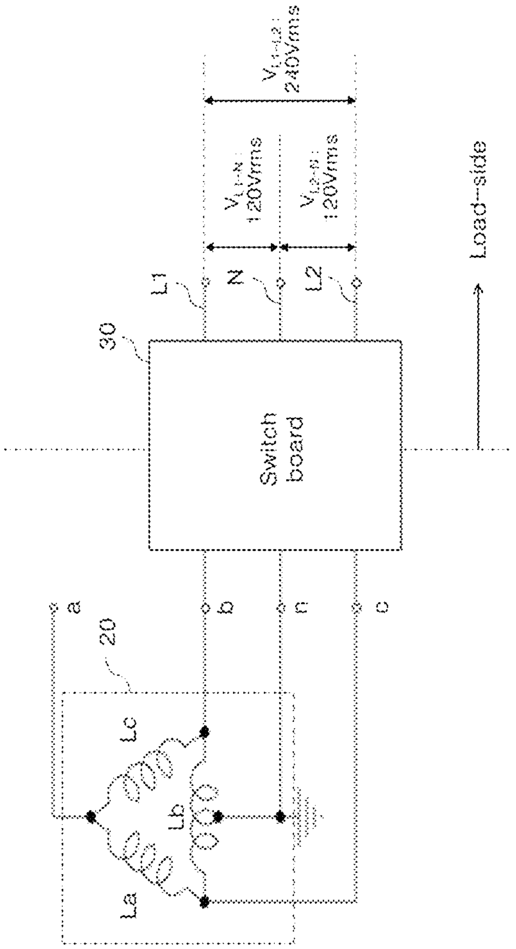
FIG. 2 is a view showing an electricity supply type of a power conversion system according to an embodiment of the present disclosure.

FIG. 2 is a view showing an electricity supply type of a power conversion system according to an embodiment of the present disclosure.

Referring to FIG. 2, an example in which the electricity supply type of the power conversion system is implemented in a single phase three-wire type is shown.

The distribution transformer 20 may have a plurality of wirings La, Lb, and Lc. The plurality of wirings La, Lb, and Lc are connected to a delta (Δ) connection, and connection points connected to each other may be connected to a plurality of AC ends a, b, and c.

The switch board 30 may electrically connect a load-side first active line L1, a load-side second active line L2, and a load-side neutral line N to the distribution transformer 20. In more detail, the load-side first active line L1 may be electrically connected to a first end of a predetermined wiring Lb of the plurality of wirings La, Lb, and Lc, the load-side second active line L2 may be electrically connected to a second end of the predetermined wiring Lb, and the load-side neutral line N may be electrically connected to a center tap of the predetermined wiring Lb for forming a neutral point n.

A load-side first active line voltage $V_{L1\text{-}N}$ corresponds to the voltage between the load-side first active line L1 and the load-side neutral line N, and a Root Mean Square (RMS) level may correspond to 'K'.

A load-side second active line voltage $V_{L2\text{-}N}$ corresponds to the voltage between the load-side second active line L2 and the load-side neutral line N, and an RMS level may correspond to 'K'. Accordingly, load-side first active line voltage $V_{L1\text{-}N}$ and the second active line voltage $V_{L2\text{-}N}$ may have the same voltage level. In this case, the load-side first active line voltage $V_{L1\text{-}N}$ and the second active line voltage $V_{L2\text{-}N}$ have a phase difference of 180°. In other words, the load-side first active line voltage $V_{L1\text{-}N}$ and the second active line voltage $V_{L2\text{-}N}$ may have opposite phases.

A load-side active line-to-line voltage $V_{L1\text{-}L2}$ may correspond to the voltage between the load-side first active line L1 and the load-side second active line L2. Further, because the load-side first active line voltage $V_{L1\text{-}N}$ and the second active line voltage $V_{L2\text{-}N}$ have opposite phases, an RMS level may correspond to '2*K'.

In an example, 'K' is set as a positive integer, and it is assumed that 'K' is set as '120' in the embodiment.

In an embodiment, an active line voltage may correspond to the potential of an active line relative to the potential of a neutral line, and an active line-to-line voltage may correspond to the potential of the first active line relative to the potential of the second active line.

Figure 3:
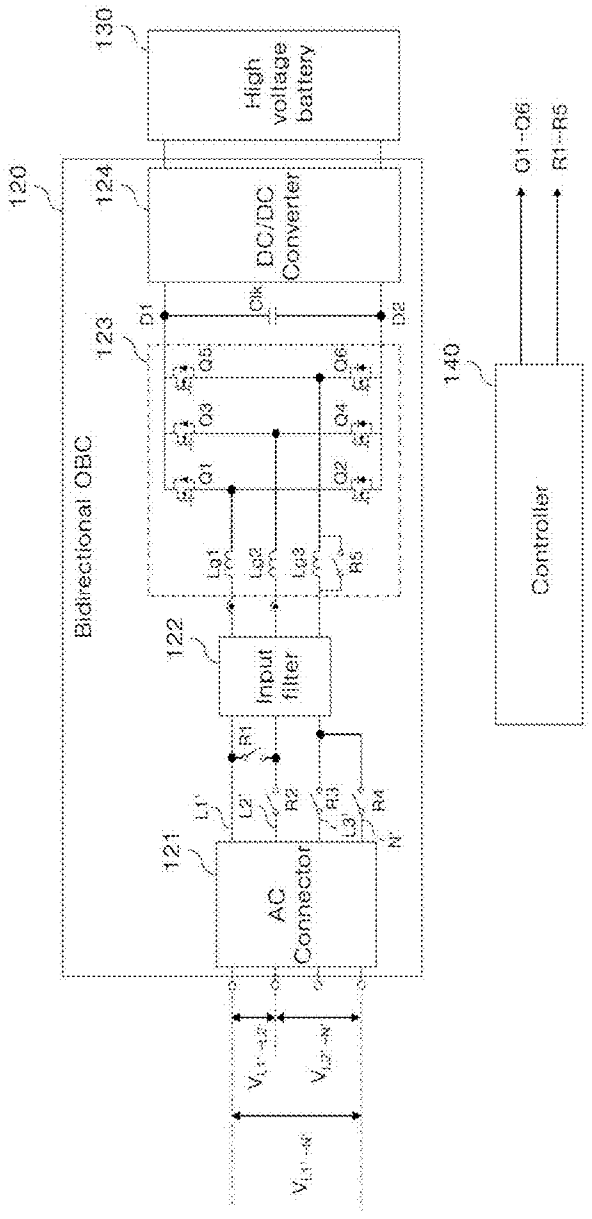
FIG. 3 is a diagram showing a configuration of a bidirectional charger according to an embodiment of the present disclosure.

FIG. 3 is a diagram showing the configuration of a bidirectional charger according to an embodiment of the present disclosure.

Referring to FIG. 3, the bidirectional charger 120 may include an AC connector 121, an input filter 122, a Power Factor Correction circuit (PFC) 123, a link capacitor Clk, a DC/DC converter 124, and a plurality of relays R1, R2, R3, R4, and R5.

The AC connector 121 may have a plurality of terminals for electrically connecting a first active line L1', a second active line L2', a third active line L3', and a neutral line N' to an external device.

The input filter 122 may be disposed between the AC connector 121 and the power factor correction circuit 123 to remove switching noise.

The power factor correction circuit 123 may include a plurality of legs Q1-Q2, Q3-Q4, and Q5-Q6 connected between a first DC end D1 and a second DC end D2. The link capacitor Clk may be connected between the first DC end D1 and the second DC end D2.

Respective internal nodes of the plurality of legs Q1-Q2, Q3-Q4, and Q5-Q6 may each be connected to a different one of the first active line L1', the second active line L2', and the neutral line N' (or the third active line L3'), respectively. In more detail, the internal node of the first leg Q1-Q2 may be connected to the first active line L' through an input inductor Lg1 and the internal node of the second leg Q3-Q4 may be connected to the second active line L2' through an input inductor Lg2. The internal node of the third leg Q5-Q6 may be connected to one of the neutral line N' or the third active line L3', depending on the turned-on state of relays R3 and R4.

A relay R1 may be connected between the first active line L' and the second active line L2', a relay R2 may be connected between the second active line L2' and the internal node of the second leg Q3-Q4, and a relay R3 may be connected between the third active line L3' and the internal node of the third leg Q5-Q6. A relay R4 may be connected between the neutral line N' and the internal node of the second leg Q3-Q4, and a relay R5 may be connected to an input inductor Lg3 in parallel between a first end and a second end of the input inductor Lg3.

The DC/DC converter 124 may bidirectionally convert the voltage between the first and second DC ends D1 and D2 and the voltage of the high-voltage battery 130. In more detail, the DC/DC converter 124 may adjust (decrease) and output the voltage of the high-voltage battery 130 to the first and second DC ends D1 and D2 in the battery discharge mode, and may adjust (increase) and output the voltage between the first and second DC ends D1 and D2 to the high-voltage battery 130 in the battery charge mode.

The controller 140 may switch the switch devices Q1-Q6 included in the power factor correction circuit 123.

The controller 140 may control the high-voltage battery 130 to be charged or discharged on the basis of a single phase two-wire type or three phase three-wire type AC voltage by controlling the turned-on state of the relays R1, R2, R3, R4, and R5. For example, when controlling the bidirectional charger 120 to convert the voltage of the high-voltage battery 130 to a single phase two-wire type AC voltage, the controller 140 may turn on the relays R1, R4, and R5 and turn off the relays R2 and R3 to use the first active line L1' and the neutral line N'. As another example, when controlling the bidirectional charger 120 to convert the voltage of the high-voltage battery 130 to a three phase three-wire type AC voltage, the controller 140 may turn on the relays R2 and R3 and turn off the relays R1, R4, and R5 to use the first active line L1', the second active line L2', and the third active line L3'.

As yet another embodiment, when controlling the bidirectional charger 120 to convert the voltage of the high-voltage battery 130 to a single phase three-wire type AC voltage, the controller 140 may turn on the relays R2, R4, and R5 and turn off the relays R1 and R3 to use the first active line L1', the second active line L2', and the neutral line N'.

In the battery discharge mode, the controller 140 switches the first left Q1-Q2, the second leg Q3-Q4, and the third leg Q5-Q6, thereby controlling the bidirectional charger 120 to output a single phase three-wire type AC voltage by converting the voltage of the high-voltage battery 130. The bidirectional charger 120 may generate a single phase three-wire type AC voltage through the first active line voltage $V_{L1'\text{-}N'}$, the second active line voltage $V_{L2'\text{-}N'}$ and the active line-to-line voltage $V_{L1'\text{-}L2'}$. In this case, the first active line voltage $V_{L1'\text{-}N'}$, may correspond to the voltage between the first active line L1' and the neutral line N', the second active line voltage $V_{L2'\text{-}N'}$, may correspond to the voltage between the second active line L2' and the neutral line N', and the active line-to-line voltage may correspond to the voltage between the first active line L1' and the second active line L2'.

The controller 140 may set the level of the first active line voltage $V_{L1'\text{-}N'}$ by switching the first leg Q1-A2 and the third leg Q5-Q6, and may set the level of the second active line voltage $V_{L2'-N'}$ by switching the second leg Q3-Q4 and the third leg Q5-Q6.

In this case, since the controller 140 sets the levels of the first active line voltage $V_{L1'-N'}$ and the second active line voltage $V_{L2'-N'}$ by switching the third leg Q5-Q6, the phases of the first active line voltage $V_{L1'-N'}$ and the second active line voltage $V_{L2'-N'}$ may be set to be the same.

When the phases of the first active line voltage $V_{L1'-N'}$ and the second active line voltage $V_{L2'-N'}$ are the same and when the RMS levels of the first active line voltage $V_{L1'-N'}$ and the second active line voltage $V_{L2'-N'}$ are the same as 120, the RMS level of the active line-to-line voltage $V_{L1'-L2'}$ may be zero ('0'). However, since the RMS level of the load-side active line-to-line voltage $V_{1-L2}$ is 240, when the RMS levels of the first active line voltage $V_{L1'-N'}$ and the second active line voltage $V_{L2'-N'}$ are the same, a load-side requested voltage and the output voltage of the bidirectional charger 120 may become different.

Accordingly, a power conversion system of a battery for a vehicle in accordance with an embodiment provides a single phase three-wire type AC voltage through connection wire swap and active line voltage control. A structure for this purpose, in accordance with an example, is shown in FIG. 4.

Figure 4:
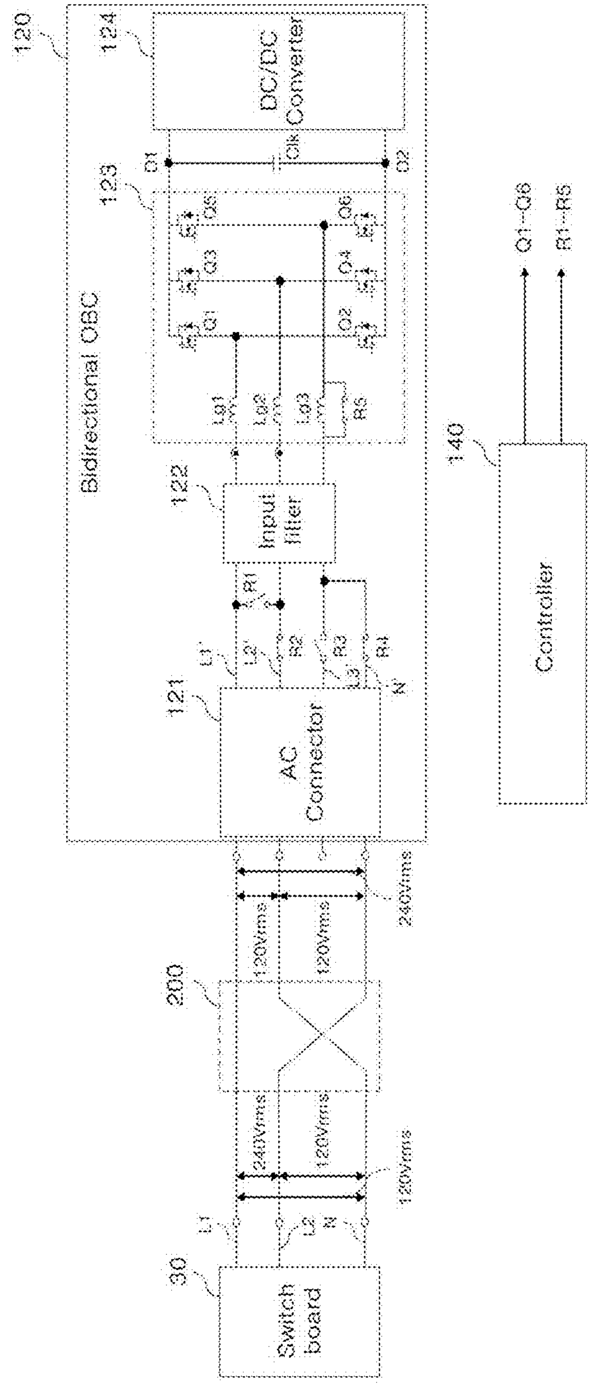
FIG. 4 is a view illustrating a process in which a power conversion system of a battery for a vehicle according to an embodiment of the present disclosure provides a single phase three-wire type AC voltage.

FIG. 4 is a view illustrating a process in which the power conversion system of a battery for a vehicle according to an embodiment of the present disclosure provides a single phase three-wire type AC voltage.

Referring to FIG. 4, the power conversion system of a battery for a vehicle may include a wiring swap device 200.

The wiring swap device 200 may electrically connect the first active line L1' to the load-side first active line L1 and may cross and electrically connect the second active line L2' and the neutral line N' to the load-side neutral line N and the load-side second active line L2, respectively. In other words, the wiring swap device 200 may electrically connect the second active line L2' and the load-side neutral line N to each other and may electrically connect the neutral line N' and the load-side second active line L2 to each other.

The bidirectional charger 120, in the battery discharge mode, may output the first active line voltage $V_{L1'-N'}$ and the second active line voltage $V_{L2'-N'}$ at different levels by converting the voltage of the high-voltage battery 130 to an AC voltage. In more detail, the power factor correction circuit 123, in the battery discharge mode, may output the first active line voltage $V_{L1'-N'}$ and the second active line voltage $V_{L2'-N'}$ at different levels by converting the voltage between the first and second DC ends D1 and D2.

The RMS level of the first active line voltage $V_{L1'-N'}$ may correspond to '2*K' and the RMS level of the second active line voltage $V_{L2'-N'}$ may correspond to 'K'. As described above, since the phases of the first active line voltage $V_{L1'-N'}$ and the second active line voltage $V_{L2'-N'}$ are the same, the RMS level of the active line-to-line voltage $V_{L1'-L2'}$ may correspond to 'K'. In an example, 'K' is set as a positive integer. For example, 'K' is set as '120', in an embodiment.

To this end, the controller 140 may switch the first leg Q1-Q3 and the third leg Q5-Q6 on the basis of an instruction for the first active line voltage VL1-W corresponding to '2*K' and may switch the second leg Q3-Q4 and the third leg Q5-Q6 on the basis of an instruction for the second active line voltage $V_{L2'-N'}$ corresponding to 'K'.

Accordingly, the power conversion system of a battery for a vehicle according to an embodiment sets the levels of the first active line voltage $V_{L1'-N'}$ and the second active line voltage $V_{L2'-N'}$ to be different through the bidirectional charger 120. Further, the second active line L2' and the neutral line N' are crossed and electrically connected to the load-side neutral line N and the load-side second active line L2, respectively, thereby controlling the bidirectional charger 120 generate a single phase three-wire type AC voltage.

Figure 5:
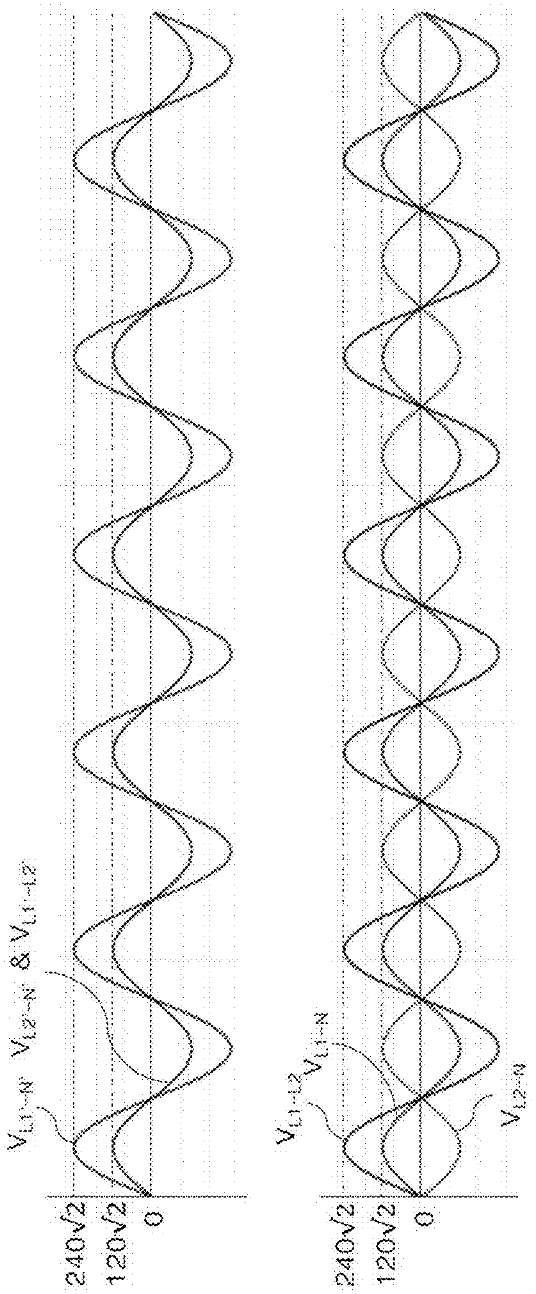
FIGS. 5 and 6 show waveforms of a line-to-line voltage to illustrate a process in which a battery discharge mode is performed in the power conversion system of a battery for a vehicle according to an embodiment of the present disclosure.
Figure 6:
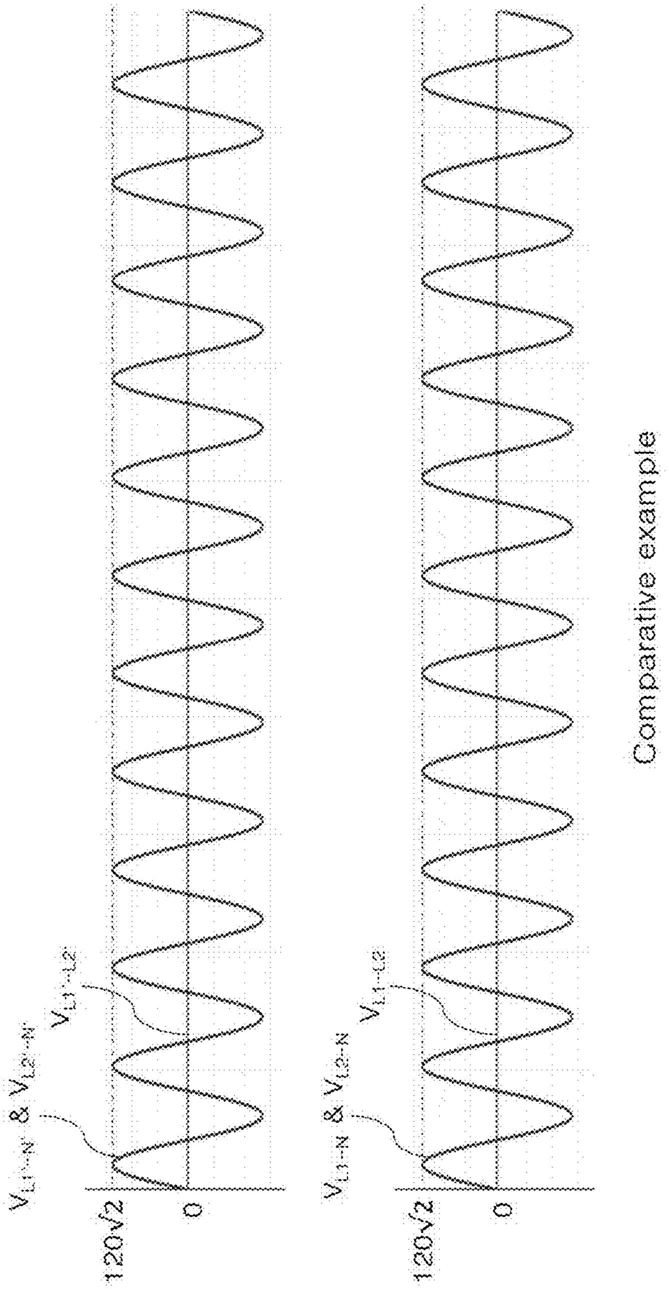

FIGS. 5 and 6 show waveforms of a line voltage to illustrate a process in which a battery discharge mode is performed in the power conversion system of a battery for a vehicle according to an embodiment of the present disclosure.

FIG. 5 corresponds to an embodiment of the present disclosure in which the levels of active line voltages are set different through the bidirectional charger 120, and the second active line L2' and the neutral line N' are crossed and connected to the load-side neutral line N and the load-side second active line L2, respectively, by the wiring swap device 200.

Referring to FIG. 5, the first active line voltage $V_{L1'-N'}$ and the second active line voltage $V_{L2'-N'}$ are the same in phase and different in RMS level as 240 and 120, respectively. Further, the RMS level of the active line-to-line voltage $V_{L1'-L2'}$ is 120.

The load-side first active line voltage $V_{L1-N}$ has the same phase as the active line-to-line voltage and the RMS level thereof is 120, which is the same as that of the active line-to-line voltage $V_{L1'-L2'}$. The load-side second active line voltage $V_{L2-N}$ and the second active line voltage $V_{L2'-N'}$ may have the same RMS level of 120, but may have opposite phases. The load-side active line-to-line voltage $V_{L1-L2}$ has the same phase as the first active line voltage $V_{L1'-N'}$ and the RMS level thereof is 120, which is the same as that of the first active line voltage $V_{L1'-N'}$.

FIG. 6 corresponds to a comparative example in which the levels of active line voltages are set to be the same by the bidirectional charger 120, the second active line L2' is electrically connected to the load-side second active line L2, and the neutral line N' is electrically connected to the load-side neutral line N without the wiring swap device 200.

Referring to FIG. 6, the first active line voltage $V_{L1'-N'}$ and the second active line voltage $V_{L2'-N'}$ are the same in phase and the same in RMS level as 120. Further, the RMS level of the active line-to-line voltage $V_{L1'-L2'}$ is zero ('0').

The load-side first active line voltage $V_{L1-N}$, the load-side second active line voltage $V_{L2-N}$, and the load-side active line-to-line voltage $V_{L1-L2}$ are the same in phase and RMS level as the respective matched ones of the first active line voltage the second active line voltage $V_{L2'-N'}$ and the active line-to-line voltage $V_{L1'-L2'}$.

FIGS. 7, 8, 9, and 10 are views illustrating examples in which a wire swap device according to an embodiment of the present disclosure is applied to the power conversion system of a battery for a vehicle.

Figure 7:
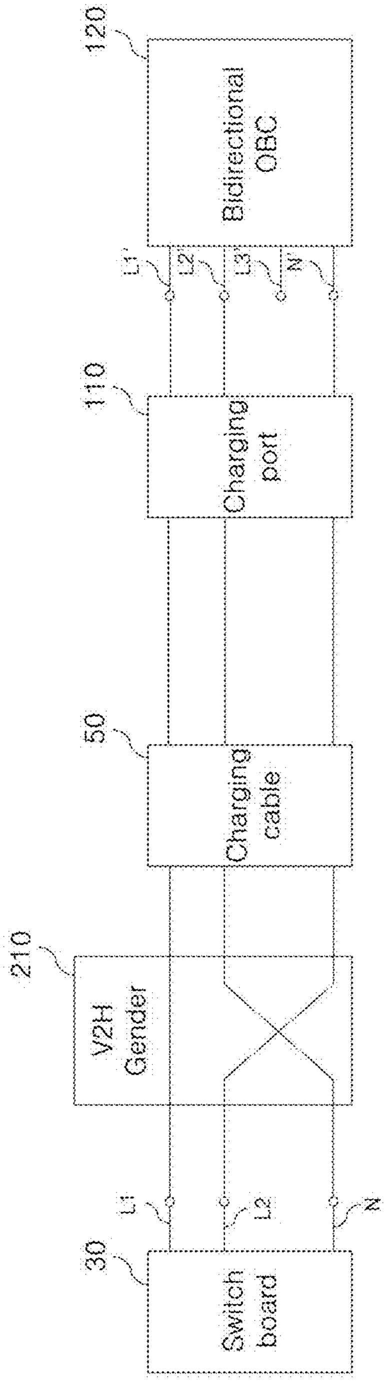
FIGS. 7, 8, 9, and 10 are views illustrating examples in which a wire swap device according to an embodiment of the present disclosure is applied to the power conversion system of a battery for a vehicle.

FIG. 7 illustrates an example in which the wiring swap device according to an embodiment of the present disclosure is implemented as a V2H gender. Referring to FIG. 7, the V2H gender 210 is coupled to a switch board side terminal of the charging cable 50, thereby being able to electrically connect the charging cable 5 and the switch board 30 to each other.

Figure 8:
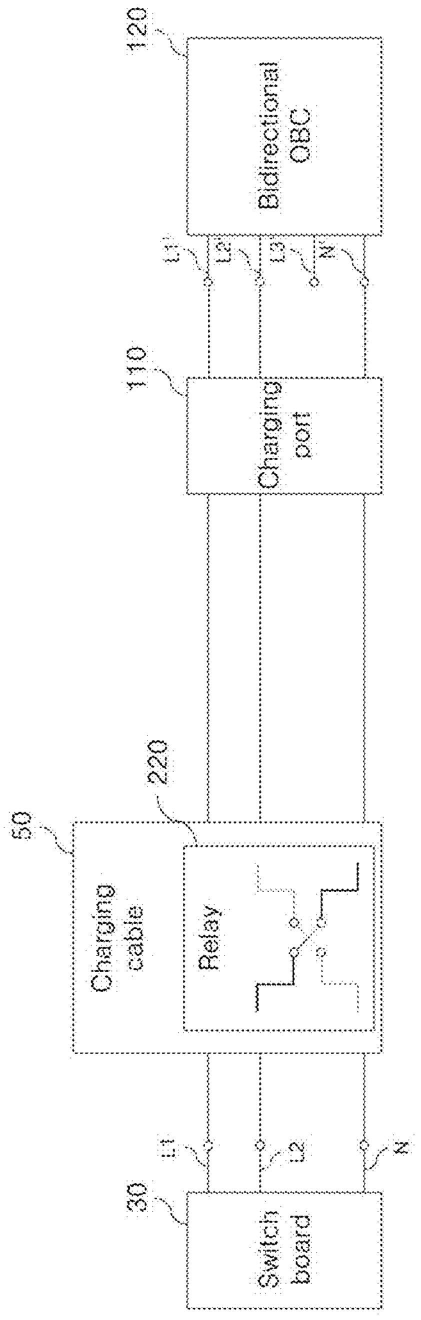

FIG. 8 illustrates an example in which the wiring swap device according to an embodiment of the present disclosure is implemented a built-in relay of a charging cable. Referring to FIG. 8, a relay 220 may cross and electrically connect the second active line L2' and the neutral line N' to the load-side neutral line N and the load-side second active line L2, respectively. The relay 220, depending on a switching state, may electrically connect the second active line L2' and the load-side second active line L2 to each other and may electrically connect the neutral line N' and the load-side second neutral line N to each other.

Figure 9:
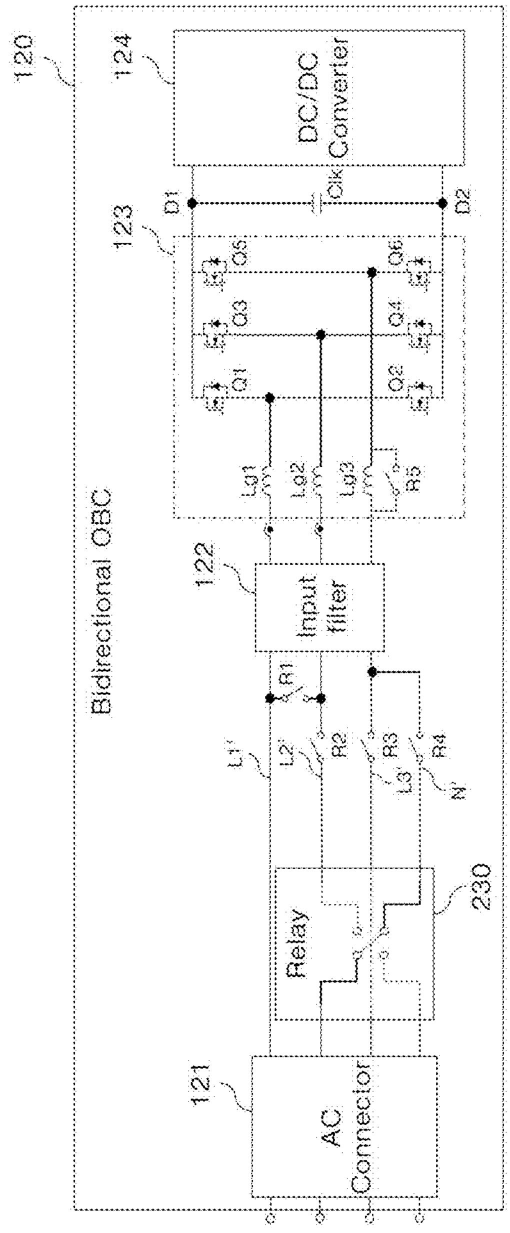

FIG. 9 illustrates an example in which the wiring swap device according to an embodiment of the present disclosure is implemented as a built-in relay of a bidirectional charger of an electrified vehicle. Referring to FIG. 9, when a battery discharge mode that generates a single phase three-wire type AC voltage is performed, a relay 230 may cross and electrically connect the second active line L2' and the neutral line N' to the load-side neutral line N and the load-side second active line L2, respectively. The relay 230, depending on a switching state, may electrically connect the second active line L2' and the load-side second active line L2 to each other and may electrically connect the neutral line N' and the load-side second neutral line N to each other.

Figure 10:
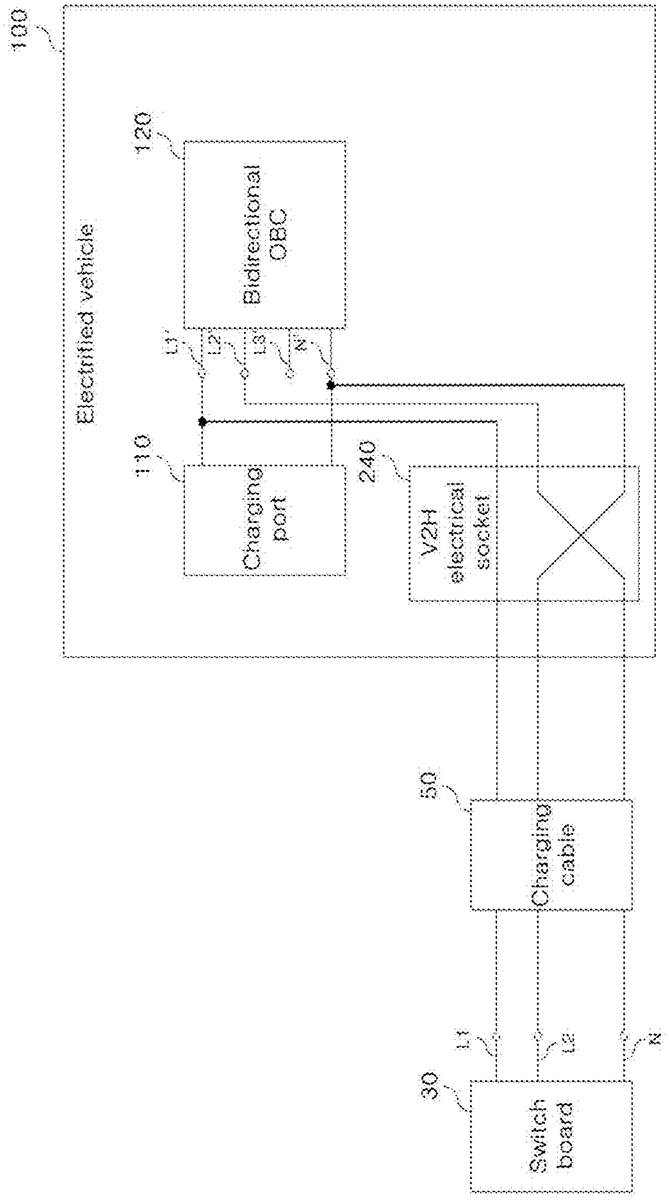

FIG. 10 illustrates an example in which the wiring swap device according to an embodiment of the present disclosure is implemented as a V2H electrical socket of an electrified vehicle. Referring to FIG. 10, a V2H electrical socket 240 is coupled to a terminal of the bidirectional charger 120 and may electrically connect a plug of the charging cable 50 and the terminal of the bidirectional charger 120 to each other.

What is claimed is:

1. A power conversion system of a battery for a vehicle, the power conversion system comprising:

a bidirectional charger configured to output a first active line voltage between a first active line and a neutral line and a second active line voltage between a second active line and the neutral line at different levels by converting a voltage of the battery to an alternating current (AC) voltage in a battery discharge mode; and a wiring swap device configured to electrically connect the first active line to a load-side first active line and to cross and electrically connect the second active line and the neutral line to a load-side neutral line and a load-side second active line, respectively.

2. The power conversion system of claim 1, wherein an RMS level of the first active line voltage corresponds to ‘2*K’ and an RMS level of the second active line voltage corresponds to ‘K’, wherein the ‘K’ is a positive integer.

3. The power conversion system of claim 2, wherein:

the load-side first active line voltage corresponds to a voltage between the load-side first active line and the load-side neutral line and has an RMS level corresponding to the ‘K’, the load-side second active line voltage corresponds to a voltage between the load-side second active line and the load-side neutral line and has an RMS level corresponding to the ‘K’, and a load-side active line-to-line voltage corresponds to a voltage between the load-side first active line and the load-side second active line and has an RMS level corresponding to the ‘2*K’.

4. The power conversion system of claim 1, wherein a phase of the first active line voltage is set to be the same as a phase of the second active line voltage.

5. The power conversion system of claim 4, wherein:

the load-side first active line voltage corresponds to a voltage between the load-side first active line and the load-side neutral line, the load-side second active line voltage corresponds to a voltage between the load-side second active line and the load-side neutral line, and the load-side first active line voltage and the load-side second active line voltage have opposite phases.

6. The power conversion system of claim 1, wherein:

the load-side first active line, the load-side second active line, and the load-side neutral line are electrically connected to a distribution transformer having a plurality of wirings connected to a delta connection through a switch board, the load-side first active line is electrically connected to a first end of a predetermined wiring of the plurality of wirings, the load-side second active line is electrically connected to a second end of the predetermined wiring, and the load-side neutral line is electrically connected to a center tap of the predetermined wiring.

7. The power conversion system of claim 1, wherein the bidirectional charger includes a power factor correction circuit having a plurality of legs, wherein the plurality of legs includes:

a first leg connected to the first active line between first and second DC ends;

a second leg connected to the second active line between the first and second DC ends; and a third leg connected to the neutral line between the first and second DC ends.

8. The power conversion system of claim 7, further comprising a controller configured to switch the first and third legs based on an instruction for the first active line voltage and configured to switch the second and third legs on the basis of an instruction for the second active line voltage.

9. The power conversion system of claim 7, wherein the bidirectional charger includes:

a link capacitor connected between the first and second DC ends; and a DC/DC converter configured to bidirectionally convert a voltage between the first and second DC ends and a voltage of the battery.

10. An electrified vehicle comprising:

a battery;

a DC/DC converter configured to adjust and output a voltage of the battery to first and second DC ends in a battery discharge mode;

a power factor correction circuit connected between the first and second DC ends, including a plurality of legs of which respective internal nodes are connected to different ones of a first active line, a second active line, and a neutral line, respectively, and configured to output a first active line voltage between a first active line and a neutral line and a second active line voltage between a second active line and the neutral line at different levels by converting a voltage between the first and second DC ends into an AC voltage in the battery discharge mode; and a wiring swap device configured to electrically connect the first active line to a load-side first active line and cross and electrically connect the second active line and the neutral line to a load-side neutral line and a load-side second active line, respectively, in the battery discharge mode.

11. The electrified vehicle of claim 10, wherein an RMS level of the first active line voltage corresponds to ‘2*K’ and an RMS level of the second active line voltage corresponds to ‘K’, in which the ‘K’ is a positive integer.

12. The electrified vehicle of claim 11, wherein:

the load-side first active line voltage corresponds to a voltage between the load-side first active line and the load-side neutral line and has an RMS level corresponding to the ‘K’, the load-side second active line voltage corresponds to a voltage between the load-side second active line and the load-side neutral line and has an RMS level corresponding to the ‘K’, and a load-side active line-to-line voltage corresponds to a voltage between the load-side first active line and the load-side second active line and has an RMS level corresponding to the ‘2*K’.

13. The electrified vehicle of claim 10, wherein a phase of the first active line voltage is set to be the same as a phase of the second active line voltage.

14. The electrified vehicle of claim 13, wherein:

the load-side first active line voltage corresponds to a voltage between the load-side first active line and the load-side neutral line, the load-side second active line voltage corresponds to a voltage between the load-side second active line and the load-side neutral line, and the load-side first active line voltage and the load-side second active line voltage have opposite phases.

15. The electrified vehicle of claim 10, wherein the plurality of legs includes:

a first leg connected to the first active line between first and second DC ends;

a second leg connected to the second active line between the first and second DC ends; and a third leg connected to the neutral line between the first and second DC ends.

16. The electrified vehicle of claim 15, further comprising a controller configured to switch the first and third legs on the basis of an instruction for the first active line voltage and configured to switch the second and third legs on the basis of an instruction for the second active line voltage.

* * * * *